United States Patent [19]
Hensolt et al.

[11] 3,886,474
[45] May 27, 1975

[54] GAS LASER HAVING AN INTEGRAL OPTICAL RESONATOR WITH EXTERNAL STABILIZING MEANS

[75] Inventors: Richard A. Hensolt, Portola Valley; Mark W. Dowley, Palo Alto, both of Calif.

[73] Assignee: Coherent Radiation, Palo Alto, Calif.

[22] Filed: Apr. 30, 1973

[21] Appl. No.: 355,710

[52] U.S. Cl. ............................................. 331/94.5 C
[51] Int. Cl. ............................................... H01s 3/08
[58] Field of Search .................................... 331/94.5

[56] References Cited
UNITED STATES PATENTS
3,229,224  1/1966  Waly et al. ........................... 331/94.5
3,783,407  1/1974  Mefferd et al. ....................... 331/94.5

*Primary Examiner*—William L. Sikes
*Attorney, Agent, or Firm*—Limbach, Limbach & Sutton

[57] ABSTRACT

A gaseous laser having an internal optical resonator is provided with external stabilizing means for maintaining alignment of mirrors forming the optical resonator. Means are also provided for allowing expansion of the remainder of the gas-confining envelope relative to the stabilized resonator mirrors during the operation of the laser.

1 Claim, 4 Drawing Figures

3,886,474

GAS LASER HAVING AN INTEGRAL OPTICAL RESONATOR WITH EXTERNAL STABILIZING MEANS

BACKGROUND OF THE INVENTION

The present invention relates to lasers and, in particular, to an improved gaseous laser.

Typically, a gaseous laser includes a gas discharge or plasma tube containing the gaseous lasing medium. Within the discharge tube, typically, are one or more anodes, a cathode and a discharge-confining bore tube.

An optical resonator is axially aligned with the region through which the discharge, between the anode and the cathode, passes. The optical resonator includes one mirror or reflector which is totally reflecting and a second mirror or reflector which is sufficiently light transmissive to allow the emergence of an output light beam from the laser.

In some gas lasers the optical resonator is external to the discharge tube. This is typical, for example, of cw noble gas ion lasers. Alternately, the optical resonator mirrors can form a part of the discharge tube envelope itself. In the latter case, the laser is said to have an integral optical resonator.

There are several disadvantages of utilizing external optical resonators. First, since both sides of each resonator are exposed to the atmosphere, dust and other impurities accumulate on the surfaces of the resonator mirrors which internally reflect the laser oscillations. This causes a loss of reflectivity of the mirrors which can seriously limit the output power of the laser.

Secondly, the internally reflected laser light must pass through the atmosphere between the discharge tube and the externally provided laser mirrors. Once again, atmospheric dust can limit the gain of the laser and can also introduce noise into the laser beam.

Third, the internally reflected light has an extra optical medium to pass through, namely, the ends of the discharge tube which typically are fitted with Brewster windows.

In contrast, the reflecting surfaces of the optical resonator mirrors, since they form a part of the discharge tube envelope, are not in contact with the atmosphere and hence do not have the problems listed above which are associated with an external optical resonator.

However, internal optical resonators thus far have been used only on low power lasers, which are comparatively small in size, such as helium-neon lasers. It is very important and, in fact, frequently critical that the optical resonator mirrors be precisely aligned and maintained in alignment during the operation of the laser. Because of the high operating temperatures involved, and the comparatively large physical size of higher powered lasers, such as ion lasers and metal-vapor lasers, it has not proven feasible to properly align and maintain in alignment the optical resonator mirrors in an internal resonator configuration.

SUMMARY OF THE INVENTION

It is, therefore, an object of the present invention to provide an improved gaseous laser.

Another object of the invention is to provide a laser having an improved internal optical resonator.

Another object of the invention is to provide an improved optical resonator design which is suitable for high power, high temperature lasers.

In accordance with the present invention, a laser having an internal optical resonator is provided with means external to the plasma tube envelope for stabilizing the mirrors forming the optical resonator.

In the preferred embodiment of the invention, each of the resonator mirrors is mounted in a mirror support which in turn forms a part of the plasma tube envelope. Stabilization of the mirrors is provided by means of a plurality of rods extending along the discharge tube and mounted at opposite ends to the resonator mirror mounts. The rods are chosen from materials which have low coefficients of thermal expansion, such as invar and quartz. By utilization of such external resonator support rods, angular and lateral misalignment of the mirrors caused by thermal gradients during the operation of the tube is minimized.

The material forming the remainder of the plasma tube envelope typically has a coefficient of thermal expansion greater than that of the resonator support rods. Thus, in accordance with another aspect of the invention, means are provided for allowing expansion and compression of the remainder of the plasma tube enclosure relative to the stabilized resonator mirror. In the embodiment described herein, a flexible diaphragm is provided as a part of the mirror support mount. Thermal expansion of the plasma tube envelope relative to the stabilized mirrors is taken up by flexing of the diaphragm.

The present invention has particular applicability in metal-vapor and ion lasers, but is equally applicable to other types of gaseous lasers.

DESCRIPTION OF THE PREFERRED EMBODIMENT

Figure 1:
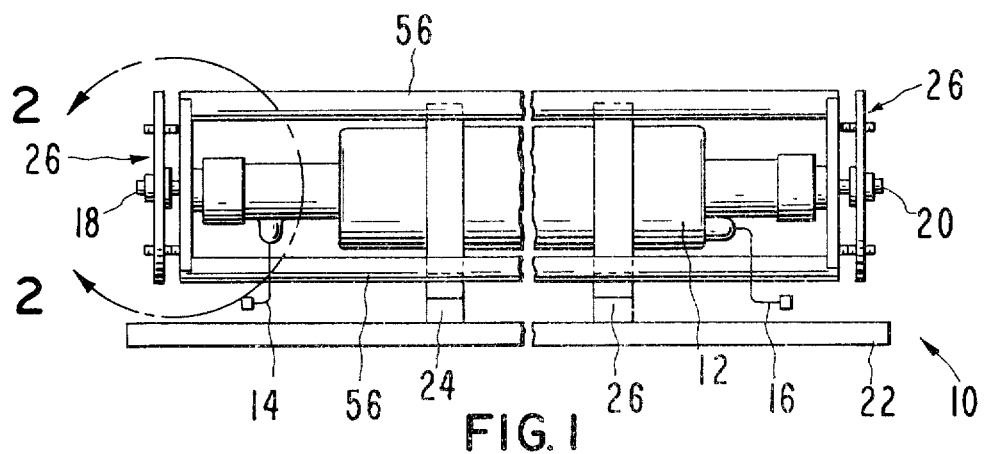
FIG. 1 is an elevational view of a gaseous laser having an internal optical resonator in accordance with the present invention.

A gaseous laser 10 in accordance with the present invention is illustrated in FIG. 1. Laser 10 includes a gas discharge tube or envelope 12 enclosing the gaseous lasing medium. Envelope 12 is made, for example, of pyrex glass. An anode lead 14 and a cathode lead 16 enable a voltage to be applied between an anode and cathode (not shown) within the discharge tube for establishing a discharge within the discharge tube 12 for exciting the gaseous medium as required for lasing action. Since laser discharge tubes are well-known to those skilled in the art and since the discharge tube plays no part in the present invention, no further detail of the discharge tube 12 is given.

A pair of mirrors 18 and 20 form the optical resonator of laser 10. One of these mirrors is substantially totally reflecting and the other is partially light transmissive, it making no difference which mirror is located at which end of tube 12. As will be explained, mirrors 18 and 20 form a part of the discharge tube envelope 12. By this, it is meant that the mirrors 18 and 20 are in direct communication with the gaseous medium of the laser. The discharge tube 12 is mounted to a baseplate 22 by a pair of tube supports 24 and 26.

Figure 2:
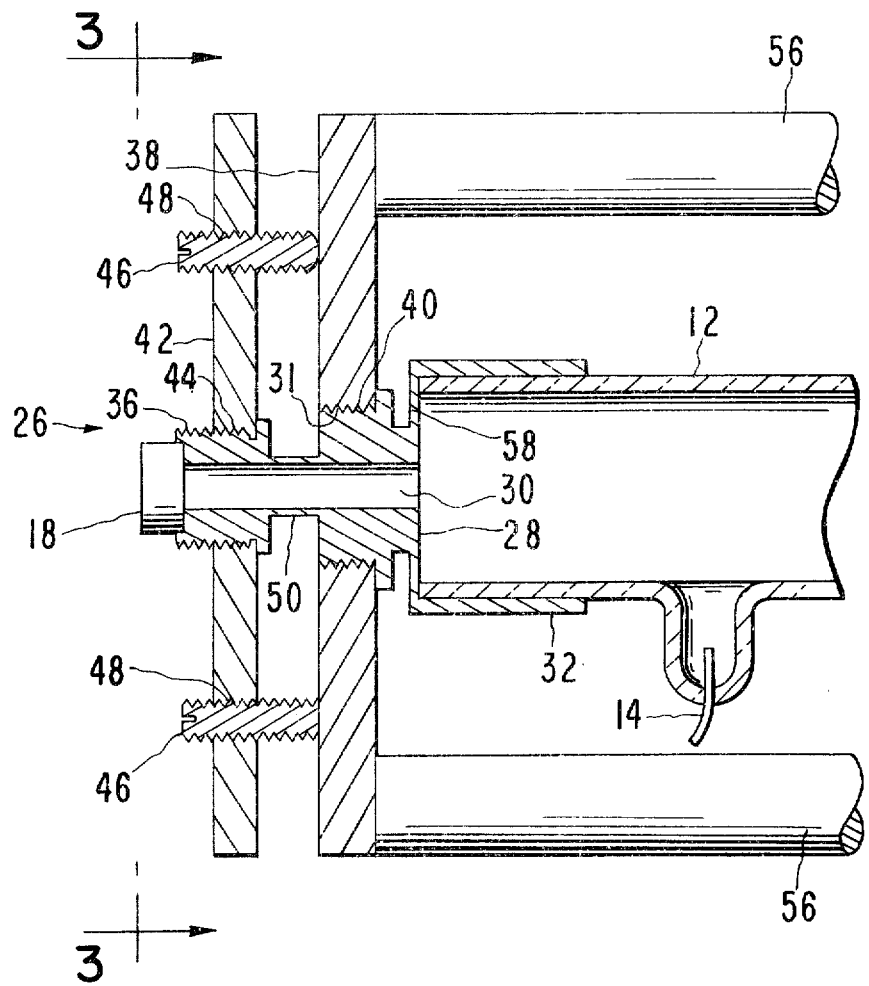
FIG. 2 is an enlarged sectional view of one end of the laser of FIG. 1.
Figure 3:
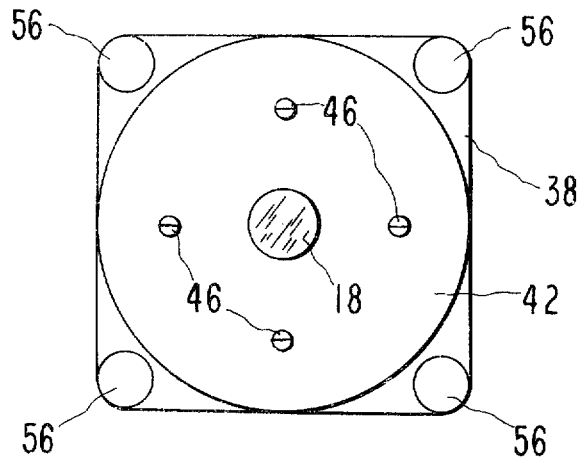
FIG. 3 is an end view of the laser depicted in FIG. 2 taken in the direction indicated by the arrows.

Each of the resonator mirrors 18 and 20 is mounted to a multiple-part mirror support and alignment assembly 26 made, for example, of aluminum. The two assemblies 26 are identical. Thus, further detail of only one of the mirror support and alignment assemblies 26 is shown in FIGS. 2 and 3.

The mirror support and alignment assembly 26 includes a hub member 28 having a central aperture or bore 30 along its axis. One end 32 of hub member 28 surrounds the remainder of the discharge tube 12 and is sealingly attached thereto to form an integral seal with the discharge tube 12.

Hub member 28, in one actual embodiment, is made of aluminum. In one actual embodiment, an epoxy having the tradename "Glasshesive" manufactured by Adhesive Engineering Co., and designated their type No. 2060 is used to seal the end 32 of the hub member 28 to the remainder of the glass discharge tube 12 which is made of pyrex.

The outside surface of the hub member 28 has first and second threaded regions 31 and 36. The diameter of the hub member 32 at the first threaded portion is greater than the diameter of the hub at the second threaded portion 36. This is to more easily enable a baseplate 38 to slip over the second threaded portion 36. The baseplate 38 has a threaded central aperture 40 so that it can be screwed upon the threaded region 31 of the baseplate 38 in the manner shown.

A mirror adjusting plate 42 has a threaded central aperture 44 so that it can be screwed on the second threaded region 36. When screwed on the hub 28, the mirror adjustment plate 42 and baseplate 38 are generally parallel and spaced-apart from each other.

Four adjusting screws 46 extend through peripheral bores 48 provided in the adjustment plate 42 and into butting engagement with the baseplate 38. If laser 10 requires further alignment, one or both of the mirrors 18 and 20 can easily be adjusted by the respective screws 46. When one or more of these screws 46 is rotated, the hub member 28 is flexed at the narrow part 50 thereof and the resonator mirror, which is affixed to the end of the hub member 28 to cover the aperture 30, can be repositioned to the desired alignment. Mirrors 18 and 20 are affixed to the hub member 28 by, for example, an epoxy such as the one referred to above.

Figure 4:
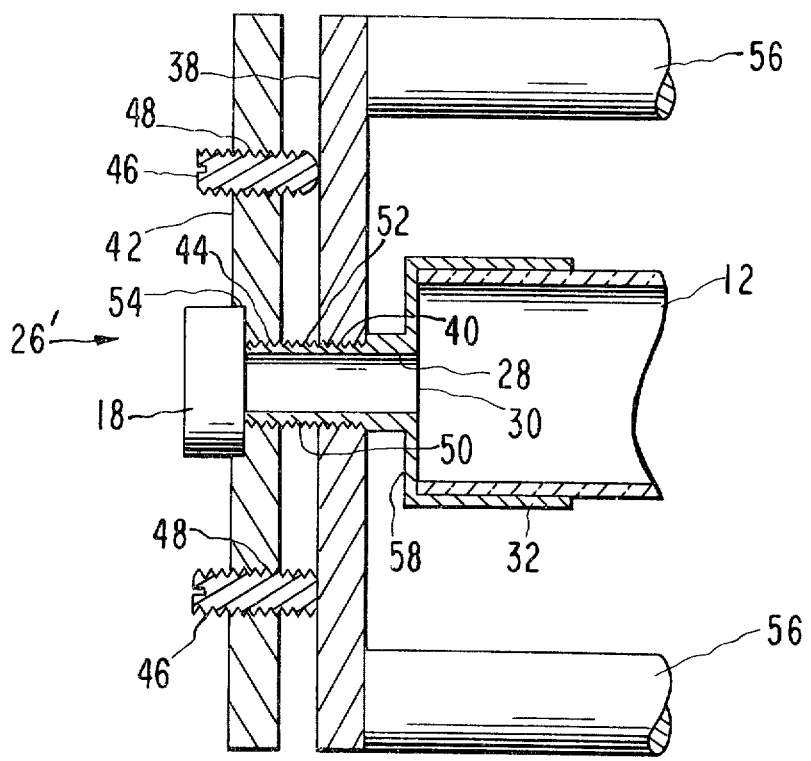
FIG. 4 is an alternate embodiment for the part of the laser depicted in FIG. 3.

An alternate mirror support and alignment assembly embodiment 26' is shown in FIG. 4. Here, the central hub 28 has a single threaded region 52. The threaded central aperture 44 and 40 of the mirror adjusting plate 42 and baseplate 38, respectively, are of the same diameter. Additionally, a recessed well 54 is provided in the outer surface of the mirror support plate 42 and the mirror 18 is fitted within the well 54 and epoxied to cover the central bore 30 of the hub member 28.

To insure a tight and permanent engagement between the mirror support plate and endplate, an epoxy such as the one referred to above can be used to seal the juncture between the threaded areas.

Four stabilizing rods 56 extend longitudinally between the baseplates 30 at opposite ends of laser 10. The stabilizing rods 56 are made of a material such as quartz which has a low coefficient of thermal expansion. The purpose of the rods is to maintain the lateral and angular alignment of the mirrors 18 and 20 despite thermal gradients occurring within the laser 10 during its operation. With the low coefficient of thermal expansion, even great changes in the temperature of the laser 10 will not result in the mirrors 18 and 20 being displaced from their desired aligned positions. Thus, in this manner, additional stabilization and support is given to mirrors 18 and 20 of the integral optical resonator.

As pointed out earlier, the main body of the discharge envelope 12 is made out of a material such as pyrex. Since pyrex has a thermal coefficient of expansion greater than that of the stabilizer rods 56, provision must be made to enable expansion of the discharge envelope 12 relative to the stabilized mirrors 18 and 20.

This is accomplished by means of a thin diaphragm 58 which joins the end tubular portion 32 to the remainder of the hub member 28. Member 58 is sufficiently flexible so that the relative greater expansion due to heat fluctuations of the pyrex envelope 12 relative to the mirror 18 and mirror support 26 absorbs such expansion.

In many laser designs the central passageway of the discharge-confining bore tube is used to define the mode-limiting aperture. Another advantage of the present invention is that the central aperture 30 of the hub member 28 can be utilized for this purpose.

We claim:

1. A gaseous laser having an integral optical resonator comprising:
    a. an enclosure for confining the gaseous laser medium;
    b. means for exciting said gaseous laser medium to provide energy levels therein required for laser action;
    c. an optical resonator comprising a pair of axially aligned mirrors;
    d. means for securing said resonator mirrors to form an integral part of said gas-confining enclosure;
    e. mirror mounts for adjustably supporting said resonator mirrors, each of said mirror mounts comprising a pair of tubular members having unequal diameters;
    f. means external to said enclosure for providing support to and stabilizing said aligned optical resonator mirrors, and external means comprising a plurality of rods of a material having a low coefficient of thermal expansion extending between said optical resonator mirror supports; and
    g. means for allowing expansion of the remainder of said enclosure relative to said stabilized resonator mirrors, said expansion allowing means comprises a diaphragm connecting said pair of tubular members, wherein said resonator mirror is mounted to one of said pair of tubular members, and wherein the other of said tubular members is mounted to said enclosure.

* * * * *